(12) United States Patent
Terada

(10) Patent No.: US 6,659,248 B2
(45) Date of Patent: Dec. 9, 2003

(54) SPRING CLUTCH

(75) Inventor: Yoshikazu Terada, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/043,343

(22) Filed: Jan. 14, 2002

(65) Prior Publication Data
US 2002/0104730 A1 Aug. 8, 2002

(30) Foreign Application Priority Data
Feb. 5, 2001 (JP) .......................... 2001-028475

(51) Int. Cl.$^7$ .............................. F16H 7/14; F16D 41/20
(52) U.S. Cl. ........................................ 192/41 S; 192/76
(58) Field of Search ........................ 192/41 S, 75, 192/76, 81 C, 107 T, 203; 267/167; 29/896.91, 896.9

(56) References Cited

U.S. PATENT DOCUMENTS

| 1,640,472 | A | * | 8/1927 | Starkey ..................... 192/41 S |
| 1,843,145 | A | * | 2/1932 | Starkey et al. ........... 192/219.2 |
| 1,935,683 | A | * | 11/1933 | Wemp ....................... 192/81 C |
| 2,277,795 | A | * | 3/1942 | Starkey et al. ............. 192/81 C |
| 2,484,185 | A | * | 10/1949 | Pepper ...................... 192/41 S |
| 2,521,670 | A | * | 9/1950 | Starkey et al. ............. 192/41 S |
| 2,668,347 | A | * | 2/1954 | Gorske ..................... 29/896.91 |
| 2,700,442 | A | * | 1/1955 | Gorske ......................... 192/47 |
| 4,728,088 | A | * | 3/1988 | Smith ......................... 267/167 |
| 5,464,198 | A | * | 11/1995 | Yanko et al. ............... 267/167 |
| 5,598,913 | A | * | 2/1997 | Monahan et al. ......... 192/41 S |

FOREIGN PATENT DOCUMENTS

JP  9-119509  5/1997

* cited by examiner

Primary Examiner—Rodney H. Bonck
(74) Attorney, Agent, or Firm—Wenderoth, Lind & Ponack, L.L.P.

(57) ABSTRACT

A spring clutch can obtain stable engaging and idling functions. Torque transmitting surfaces having substantially the same diameter are formed on the inner periphery of a pulley hub, which is mounted on a rotary shaft, and on the inner periphery of a pulley. A coil spring pressed into both torque-transmitting surfaces is mounted so as to straddle and thereby frictionally engage with both torque-transmitting surfaces. A chamfer is provided on the outer peripheral edge of an end face of the coil spring to stabilize the engaging and idling functions of the spring clutch.

10 Claims, 3 Drawing Sheets

Fig. 4(I)a
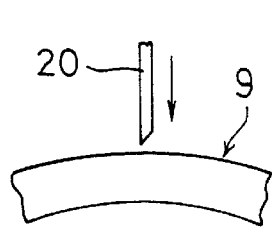
Fig. 4(I)b
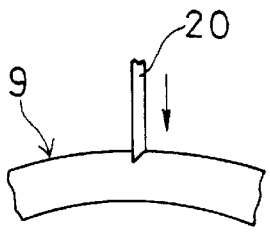
Fig. 4(I)c
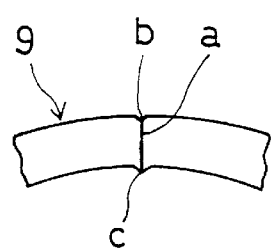
Fig. 4(II)a
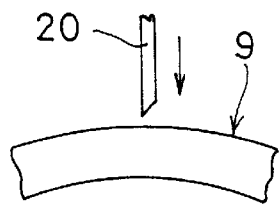
Fig. 4(II)b
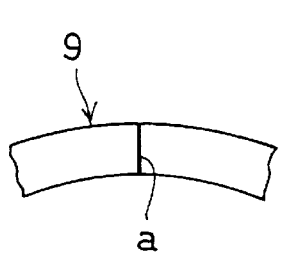
Fig. 4(II)c
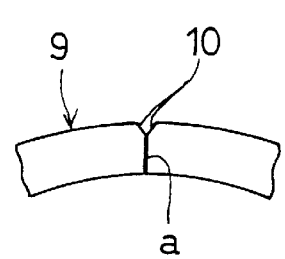
Fig. 4(III)a
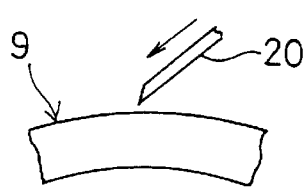
Fig. 4(III)b
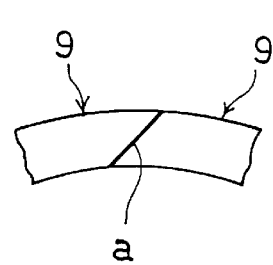
Fig. 4(III)c
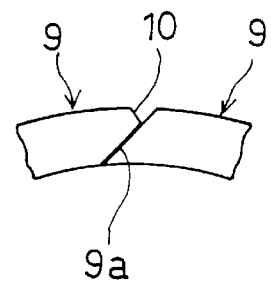

SPRING CLUTCH

BACKGROUND OF THE INVENTION

This invention relates to a spring clutch for transmitting the rotation of an input member to an output member, and for shutting off the transmission of the rotation of the output member to the input member.

Generally, in an automotive engine, the crankshaft is subjected to change in its angular velocity in one rotation since driving energy is produced during the explosion stroke. When an engine accessory having a large inertia such as an alternator is driven by such a crankshaft through a belt transmission, slip occurs between a pulley mounted on the rotary shaft and the belt when the angular velocity of the crankshaft decreases and if the rotating speed of the rotary shaft of the engine accessory exceeds the angular velocity of the crankshaft.

Also, when the engine is changed over from high-speed to low-speed and the velocity of the belt drops, slip occurs between the pulley and the belt since the engine accessory such as an alternator maintains high-speed rotation due to inertia. During such slip, abnormal noise is produced, or the belt wears and its durability thus lowers.

In order to solve such a problem, in accordance with a clutch pulley device as disclosed in JP patent publication 9-119509, a spring clutch is provided between a pulley hub and a pulley. The pulley hub is mounted on the rotary shaft of an alternator, and the pulley, which rotates by contact with a belt, is mounted so as to be rotatable relative to the pulley hub to transmit the rotation of the pulley from the pulley hub to the rotary shaft through the spring clutch. When the rotating speed of the rotary shaft exceeds that of the pulley, transmission of the rotation from the rotary shaft to the pulley is shut off by the spring clutch.

The spring clutch is formed with cylindrical surfaces having the same inner diameter as the inner peripheries of the pulley hub and the pulley, and a coil spring having a larger outer diameter than the diameter of the cylindrical surfaces is mounted so as to straddle the cylindrical surfaces of the pulley hub and pulley. With such a formation of the spring clutch, the diameter of the coil spring increases as the pulley rotates, which thereby increases the frictional force of the coil spring on the cylindrical surfaces so as to transmit the rotation of the pulley to the pulley hub through the coil spring.

Also, when the rotating speed of the pulley hub exceeds that of the pulley, the coil spring is wound to weaken its frictional force against the cylindrical surfaces, thereby causing slip between the cylindrical surfaces and the coil spring.

If an existing coil spring is used as the coil spring instead of a coil spring as described above in the preceeding two paragraphs, burrs are formed on the end faces in many cases since the end faces of existing coil springs are formed by shearing.

If a coil spring having burrs formed on its end faces is mounted between the cylindrical surfaces of the pulley hub and the pulley, the burrs will engage the cylindrical surfaces, thus making the engagement between the outer periphery of the coil spring and the cylindrical surfaces unstable. Also, since a coil spring having burrs on its end faces cannot slide smoothly on the cylindrical surfaces during the shut-off of the transmission of the reverse input torque resulting from a shrinkage of the coil spring, the spring clutch cannot stably perform engaging and idling functions.

Also, since the surface pressure increases at the contact portions between the cylindrical surfaces and the burrs, the cylindrical surfaces will be abraded abnormally.

An object of this invention is to provide a spring clutch which can perform stable engaging and idling functions and which can suppress abnormal wear of torque-transmitting surfaces against which the coil spring is pressed.

SUMMARY OF THE INVENTION

According to this invention, there is provided a spring clutch comprising an input member, an output member mounted coaxially with the input member in which the input member and the output member are each formed with a cylindrical torque-transmitting surface having substantially the same diameter, and a coil spring mounted so as to be pressed against and to straddle, i.e. engage with, the torque-transmitting surfaces, wherein the coil spring has two end faces each extending to an edge, and each of the edges is chamfered at least extending along an outer periphery of a portion of the edges which oppose the torque-transmitting surfaces.

The chamfer may be of a shape formed by grinding an edge in a straight line or arcuately, or by rounding an edge, e.g. by tumbling, but not by cutting.

By providing a chamfer on an end face formed by cutting the coil spring, it is possible to prevent the edge of the end face of the coil spring from being brought into strong frictional engagement with the cylindrical surfaces of the input and output members.

Thus, in a spring clutch in which cylindrical torque-transmitting surfaces are formed on the inner peripheries of the input member and the output member and a coil spring is mounted so as to straddle and thereby engage with these torque-transmitting surfaces, the entire periphery of the coil spring is brought into frictional engagement with the cylindrical surfaces when the diameter of the coil spring increases. A stable engaging function is thereby obtained, and during idling, due to a reduction in the diameter of the coil spring, abnormal wear of the torque-transmitting surfaces is avoided.

The spring clutch is not limited to one in which cylindrical torque-transmitting surfaces are formed on the inner peripheries of the input member and the output member.

For example, the spring clutch may be one in which cylindrical torque-transmitting surfaces of substantially the same diameter are formed on the outer peripheries of the input member and the output member, and a coil spring is pressed against these torque-transmitting surfaces. In such a spring clutch, rotation of the input member is transmitted to the output member by reducing the diameter of the coil spring, and when the rotating speed of the output member exceeds that of the input member, the diameter of the coil spring is increased to prevent the rotation of the output member from being transmitted to the input member.

The coil spring may be made from wire material having a circular cross-section or a square cross-section When a coil spring made from a wire material having a square cross-section is used, since the entire outer or inner peripheral surface of the coil spring contacts the torque-transmitting surfaces by frictional engagement of the coil spring during torque transmission, it is possible to obtain a spring clutch which has a large load capacity and which lowers the wear of the torque-transmitting, surfaces, because the surface pressure is low compared to a coil spring made from a wire material of a circular cross-section.

With a coil spring made from a square cross-section wire material, its diameter increases or decreases with the adjacent coil portions of the coil spring in close contact with each other, and while the diameter of the wire material is increasing or decreasing, the coil spring is deformed while twisting. Smooth twisting deformation, however, is not possible because four corners of the section of the wire material are deformed while abrading sides of the adjacent coil portions.

Thus, in the case of a coil spring made from a square wire material, chamfers are preferably provided on the four corners of the end face section of the wire material.

Other features and objects of the present invention will become apparent from the following description made with reference to the accompanying drawings.

BRIEF DESCRIPTION OF THE DRAWINGS

FIGS. 4(I)a to 4(III)c are front views showing examples of the shearing of the coil springs.

DETAILED DESCRIPTION OF THE PREFERRED EMBODIMENT

Figure 1:
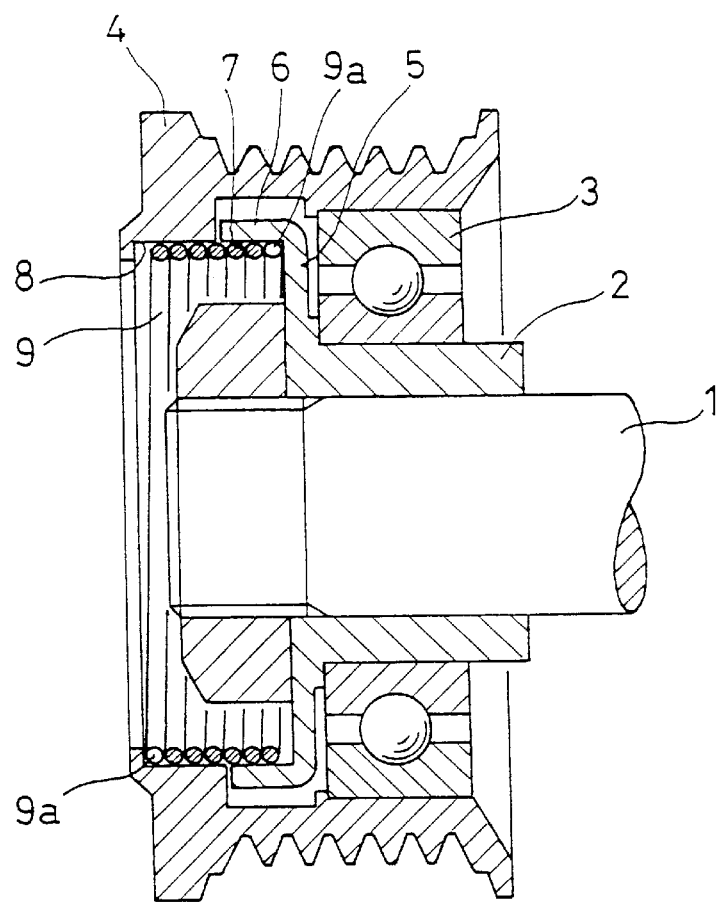
FIG. 1 is a vertical sectional front view showing an embodiment of the spring clutch according to the inventions.

Hereinbelow, a preferred embodiment of this invention will be described with reference to the drawings. FIG. 1 shows a one-way overrunning clutch pulley device (hereinafter referred to as clutch pulley device) in which the spring clutch according to the invention is used. This clutch pulley device includes a rotary shaft 1. A pulley hub 2, as an output member, is mounted to one end of the rotary shaft 1. A pulley 4, as an input member, is rotatably supported by a bearing 3, which is mounted on the pulley hub 2.

The pulley hub 2 is prevented from rotating relative to the rotary shaft 1 and instead rotates together with the rotary shaft. At one end of the pulley hub 2, a flange 5 is formed, and a cylindrical portion 6 is provided on the outer periphery of the flange 5. On the inner periphery of the cylindrical portion 6, a cylindrical torque-transmitting surface 7 is formed.

The pulley 4 is rotated by the movement of an unillustrated ribbed belt trained on the outer periphery of the pulley 4. On the inner periphery of the outer end of the pulley 4, a cylindrical torque-transmitting surface 8 is formed. The torque-transmitting surface 8 formed on the pulley 4 is axially aligned with the torque-transmitting surface 7 formed on the pulley hub 2. The inner diameters of these torque-transmitting surfaces 7 and 8 are substantially equal to each other.

A coil spring 9 is mounted so as to straddle and thereby engage with the torque-transmitting surfaces 7 and 8. In its natural state, the outer diameter of the coil spring 9 is larger than the inner diameter of the torque-transmitting surfaces 7 and 8. The coil spring 9 is pressed into the pulley 4 and the cylindrical portion 6 by shrinking it so that the outer periphery of the coil spring 9 is frictionally pressed against the torque-transmitting surfaces 7 and 8.

If the pulley 4 is rotated rightwardly as viewed from the left-hand side in FIG. 1, a right-hand coil spring is used as the coil spring 9. Instead, if the pulley 4 is rotated leftwardly, a left-hand coil spring is used as the coil spring 9.

With the pulley clutch device having the above-described structure, the effective diameter of the coil spring 9 will increase due to a frictional contact with the torque-transmitting surface 8 when the pulley 4 rotates by contact with the ribbed belt. As a result, the press-engaging force of the coil spring 9 against the torque-transmitting surfaces 7 and 8 increases until the rotation of the pulley 4 is transmitted through the coil spring 9 and in turn to the pulley hub 2, and thus the rotary shaft 1 rotates in the same direction as the pulley 4.

While the rotary shaft 1 is rotating, if its rotating speed exceeds that of the pulley 4, the diameter of the coil spring 9 decreases due to contact with the torque-transmitting surface 7 formed on the pulleys hub 2. As a result, the frictional engagement force between the coil spring 9 and the torque-transmitting surfaces 7 and 8 decreases, slip occurs at the contact portions between the coil spring 9 and the torque-transmitting surfaces 7 and 8, and the rotation of the rotary shaft 1 is prevented from beings transmitted to the pulley 4.

In this pulley clutch device, if there are burrs formed on the end face 9a of the coil spring 9 by cutting, as described above in the BACKGROUND OF THE INVENTION, the burrs will engage the torque-transmitting surfaces 7 and 8, which are cylindrical surfaces, thus making the frictional engagement force between the outer periphery of the coil spring 9 and the torque-transmitting surfaces 7 and 8 unstable. Also, because the coil spring 9 cannot slide smoothly on the torque-transmitting surfaces 7 and 8 while transmission of the reverse input torque is prevented due to a reduced diameter of the coil spring 9, the spring clutch cannot perform stable engaging and idling functions.

Figure 2:
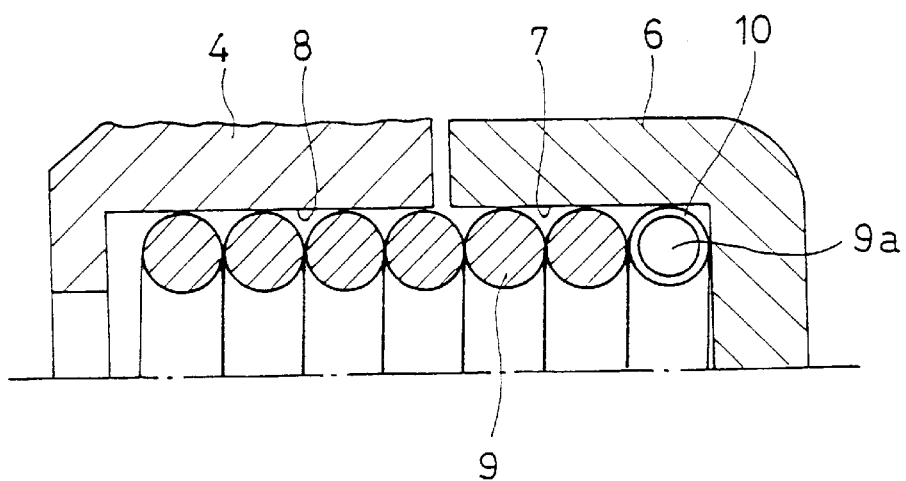
FIG. 2 is an enlarged sectional view of the coil spring in its assembled state.
Figure 3A:
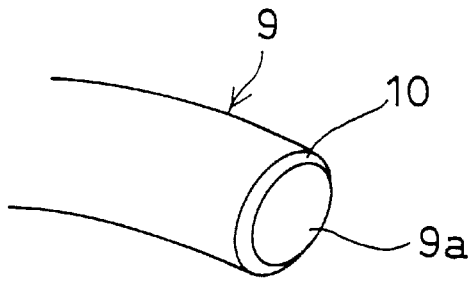
FIGS. 3A–3C are perspective views of examples of the coil spring.

In order to solve such a problem, as shown in FIGS. 2 and 3A, a chamfer 10 is provided on the outer periphery of the end face 9a formed by shearing a coil spring 9 made from a wire material having a circular section.

By providing the chamfer 10 on the end face 9a of the coil spring 9, which is formed by shearing the coil spring 9, burrs formed during shearing are completely removed Thus, when the diameter of the coil spring 9 is increased, the entire outer periphery of the coil spring 9 is brought into frictional engagement with the torque-transmitting surfaces 7 and 8 so that a stable engaging function is obtainable.

Also, during idling when the diameter of the coil spring 9 is reduced, the coil spring will slide smoothly on the torque-transmitting surfaces 7 and 8 thus preventing the torque-transmitting surfaces from getting worn abnormally.

Figure 3B:
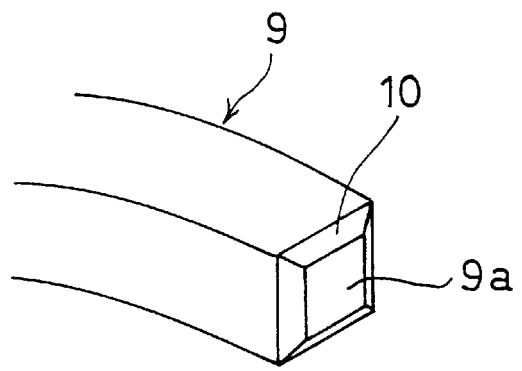

In the example of the coil spring 9 shown in FIG. 2, a coil spring made from in a wire material having a circular cross-section is shown. But as shown in FIG. 3B, the coil spring 9 may be made from a wire material having a square cross-section. In this case, a chamfer 10 may be provided on all the sides of the outer peripheral edge of the square end face 9a, or chamfers 10 are provided only on edges facing the torque-transmitting surfaces 7 and 8.

If the coil spring 9 is made from a wire material having a square cross-section, a spring clutch having a large load capacity is provided, since the entire outer peripheral surface of the coil spring 9 is brought into contact with the torque-transmitting surfaces 7 and 8 during torque transmission by the frictional engagement of the coil spring 9. Also, since the surface pressure for the torque-transmitting surfaces 7 and 8 is low compared with a coil spring made from a wire material having a circular cross-section, it is possible to reduce the wear of the torque-transmitting surfaces 7 and 8.

Twisting deformation develops in the coil spring 9 when its diameter increases or decreases. Thus, with a coil spring 9 made from a wire material having a square cross-section, the coil spring 9 is deformed while its edges abrade sides of the adjacent coil portions since there are edges at the four corners in the section of the wire material, and thus smooth twisting deformation is impossible.

Figure 3C:
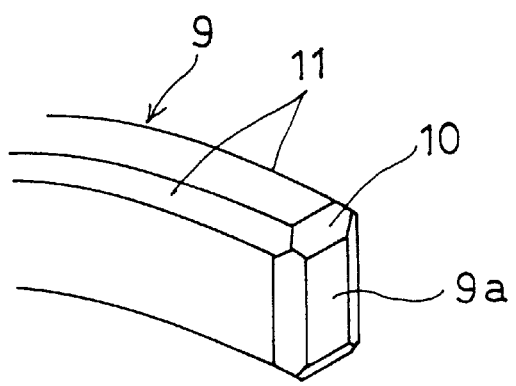

As shown in FIG. 3C, smooth twisting deformation of the coil spring 9 is possible by providing chamfers 11 at the four ridges of the square wire material.

A coil spring 9 with a predetermined length is formed by shearing. During shearing, if the wire material is soft and the coil spring 9 is sheared by radially moving the cutter 20 from the outer-diameter side toward the inner-diameter side of the coil spring 9 as shown in FIG. 4(I)A, sagging b is formed on the outer-diameter edge of the sheared surface a and burr c is formed on its inner-diameter side, as shown in FIG. 4(I)C.

Since the sagging b provides a similar result to the case in which the chamfer 10 is formed, it eliminates the need of chamfering after shearing the coil spring 9.

In the mounted state of FIG. 1, the coil spring 9 has its outer periphery function as a frictional engaging surface for the torque-transmitting surfaces 7 and 8 so that the burr c formed on the inner-diameter side of the sheared surface a will have no influence on the transmission and shut-off of the turning torque. Thus, the burr c may be removed or left as it is.

If the inner-diameter surface of the coil spring 9 is used as a frictional engagement surface, the coil spring 9 is sheared by moving the cutter 20 from the inner-diameter side to the outer-diameter side of the coil spring 9.

In shearing a coil spring 9 made of a hard wire material, as shown in FIGS. 4(II)a and 4(II)b, a chamfer 10 is formed after shearing on the outer-diameter edge of the sheared surface a, as shown in FIG. 4(II)c, because sagging is scarcely formed on the shearing surface a.

As shown in FIGS. 4(III)a and 4(III)b, by obliquely shearing the coil spring 9 with the cutter 20, the sheared surface a is made as an inclined surface. In this case, it is unnecessary to form a chamfer on one of the end faces 9a of the coil spring 9, and a chamfer 10 is formed only on the other end face 9a of the coil spring, as shown in FIG. 4(III)c.

In this embodiment according to the present invention, the spring clutch is applied to a one-way overrunning clutch pulley device. It can also be applied to a one-way flexible coupling described in JP patent publication 11-1218151.

According to the invention, by providing a chamfer on the outer peripheral edge of an end face of the coil spring, it is possible to obtain stable >P.>engaging and idling functions and also suppress abnormal wear of the torque-transmitting surfaces with which the coil spring is brought into press engagement.

What is claimed is:

1. A spring clutch comprising an input member, an output member mounted coaxially with said input member, said input member and said output member being formed with respective cylindrical torque-transmitting surfaces having substantially the same diameter, and a coil spring mounted so as to be pressed against and engaged with said torque-transmitting surfaces, wherein said coil spring has two end faces each extending to an edge defining an outer periphery of said end faces, each of said edges being chamfered at least extending along an outer periphery of a portion of said edges which oppose said torque-transmitting surfaces.

2. The spring clutch according to claim 1 wherein said coil spring is made from a wire material having a circular cross-section, and a chamfer is provided along the outer periphery of said edges of both end faces of said coil spring.

3. The spring clutch according to claim 1 wherein said coil spring is made from a wire material having a square cross-section.

4. The spring clutch according to claim 3 wherein said coil spring comprises four chamfered edges extending in the longitudinal direction of said coil spring.

5. The spring clutch according to claim 1 wherein said each of said edges being chamfered are chamfered so that burrs formed during shearing are removed.

6. A spring clutch comprising:

an input member;

an output member mounted coaxially with said input member, said input member and said output member being formed with respective cylindrical torque-transmitting surfaces having substantially the same diameter; and a coil spring coiled in a longitudinal direction and mounted so as to be pressed against and engaged with said torque-transmitting surfaces, said coil spring having two end faces each perpendicular to the longitudinal direction of said coil spring and extending to an edge defining an outer periphery of said end faces, wherein each of said edges are chamfered continuously at least across portions of an outer periphery of said edges latitudinally opposing said torque-transmitting surfaces.

7. The spring clutch according to claim 6 wherein said coil spring is made from a wire material having a circular cross-section, and a chamfer is provided along the outer periphery of said edges of both end faces of said coil spring.

8. The spring clutch according to claim 6 wherein said coil spring is made from a wire material having a square cross-section.

9. The spring clutch according to claim 6 wherein said coil spring comprises four chamfered edges extending in the longitudinal direction of said coil spring.

10. The spring clutch according to claim 6 wherein said each of said edges are chamfered so that burrs formed during shearing are removed.

* * * * *